(12) United States Patent
Decker

(10) Patent No.: US 6,195,338 B1
(45) Date of Patent: Feb. 27, 2001

(54) METHOD OF SETTING THE PERSISTENCE OF A MOBILE STATION IN A CELLULAR MOBILE RADIO NETWORK

(75) Inventor: Peter Decker, Marl (DE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/974,249

(22) Filed: Nov. 19, 1997

(30) Foreign Application Priority Data

Nov. 20, 1996 (DE) .............................................. 196 48 077

(51) Int. Cl.⁷ ...................................................... H04Q 7/20
(52) U.S. Cl. .............................................. 370/252; 370/329
(58) Field of Search .................................... 370/252, 328, 370/329, 345, 346, 347, 445, 447, 462, 461

(56) References Cited

U.S. PATENT DOCUMENTS

| 4,707,832 | * | 11/1987 | Glenn et al. | 370/489 |
| 5,257,257 | | 10/1993 | Chen et al. | 370/18 |
| 5,483,533 | * | 1/1996 | Kuba | 370/79 |
| 5,563,895 | | 10/1996 | Malkamaki et al. | 371/32 |
| 5,640,395 | | 6/1997 | Hamalainen et al. | 370/322 |
| 5,706,274 | * | 1/1998 | Angelico et al. | 370/445 |
| 5,896,561 | * | 4/1999 | Schrader et al. | 455/67.1 |

FOREIGN PATENT DOCUMENTS

| 195 13 472A1 | 10/1996 | (DE) . |
| 0 472 349 A2 | 2/1992 | (EP) . |
| 2 266 030 | 10/1993 | (GB) . |
| 07222246 | 8/1995 | (JP) . |

OTHER PUBLICATIONS

Biala, Jacek: Mobilfunk und Intelligente Netze, Friedr. Vieweg & Sohn Verlagsgesellschaft mbH, Braunschweig/Wiesbaden, 1995, pp. 299–301 und 387.

* cited by examiner

Primary Examiner—Min Jung
(74) Attorney, Agent, or Firm—Perman & Green, LLP

(57) ABSTRACT

The control of the overload protection In cellular networks takes place via a two-step adaptation of the access persistence of the mobile station (M) by the transmission of persistence rules (P) for the long-term adaptation and by the transmission of current load characteristic variables (p(i)) for the short-term adaptation from the base station (B) to the mobile station (M).

6 Claims, 1 Drawing Sheet

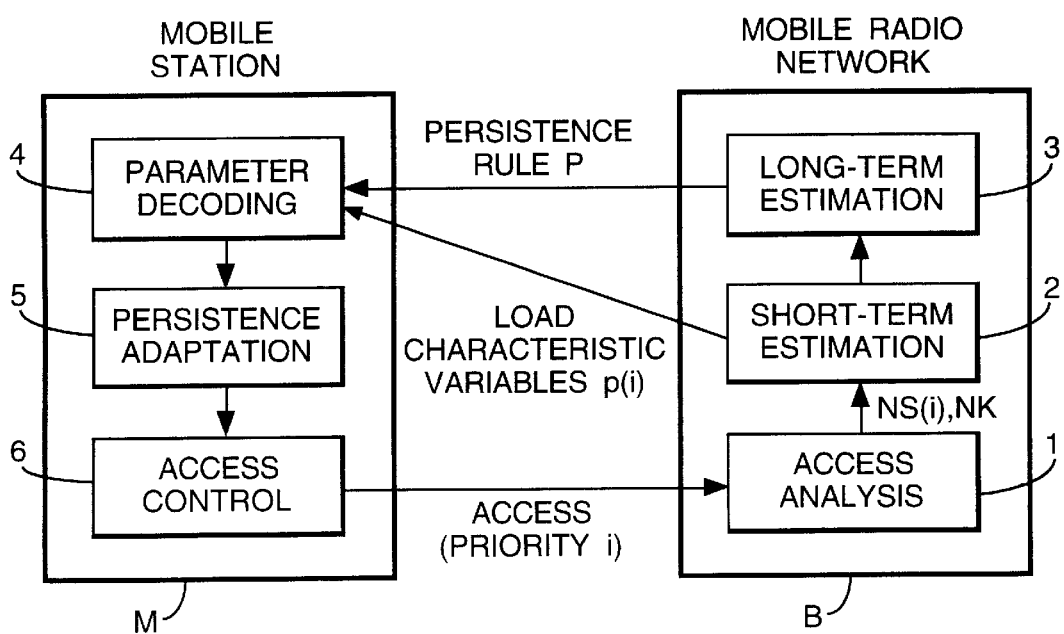

METHOD OF SETTING THE PERSISTENCE OF A MOBILE STATION IN A CELLULAR MOBILE RADIO NETWORK

BACKGROUND OF THE INVENTION

The invention relates to a method of setting the persistence of a mobile station in a cellular mobile radio network. The access probability of the mobile station can be considered for example as an instance of persistence.

In cellular mobile radio networks the available physical radio channels are divided up between the mobile radio subscribers in such manner that a subscriber is assigned a radio channel only for the duration of a communication connection. Here the assignment of the radio channels is controlled by the mobile radio network.

If the mobile station makes a transmission request, this request must start an access attempt on a radio channel specially intended for this purpose (random access channel) in contention with the other mobile stations in the same radio cell. If this access is successful, the mobile station is allocated a specified radio channel. If a collision occurs or if the transmission is disturbed by transmission errors, no such allocation takes place and the mobile station repeats the transmission.

Access procedures of this type are well known, being based on so-called S-ALOHA-protocols, and are used in various cable networks and radio networks.

The S-ALOHA-protocols are known for their stability problems in the case of a high offered traffic load. If the offered traffic exceeds a critical value, a simultaneous increase occurs in the number of collisions, the number of mobile stations with transmission requests increasing further as a result of the repetitions. To eliminate this overload situation, the persistence of the access of the mobile station is generally adapted to the current load. Here in general the access probability, the waiting time between two accesses, and the maximum number of access attempts are varied.

For differentiation between different priorities, the control of the persistence can additionally be used to give precedence to specific stations actually during access.

In accordance with the invention there is provided a method of setting the persistence of a mobile station (M) in a cellular mobile radio network, characterised in that the persistence is set in two steps, and specifically by a persistence rule (P) for the long-term adaptation and by load characteristic variables (p(i)) for the short-term adaptation.

The Invention provides a method of the type referred to in the introduction with which the persistence of the mobile station can be set with less delay, greater accuracy, greater stability and in a simpler manner.

The method according to the invention for setting the persistence of a mobile station in a cellular mobile radio network is characterised in that the persistence is set in two steps, and specifically by a persistence rule for the long-term adaptation and by load characteristic variables for the short-term adaptation.

In a development of the invention, a long-term persistence behaviour is calculated in the base station and transmitted in the form of the persistence rule to the mobile station. It is also possible to calculate a short-term persistence behaviour in the base station and to transmit this in the form of current load characteristic variables to the mobile station.

In another development of the invention, the persistence of the mobile station can be a function of the load characteristic variable of the priority in question and the sum of load characteristic variables of lower priorities.

BRIEF DESCRIPTION OF THE DRAWING

In the following the invention will be explained in detail making reference to the single FIGURE.

DETAILED DESCRIPTION OF THE INVENTION

For the control of the overload protection, a two-step adaptation of the access persistence of the mobile station M takes place by the transmission of a persistence rule P for the long-term adaptation and the transmission of current load characteristic variables p(i) for the short-term adaptation from the mobile radio network or base station B to the mobile station M.

Here the base station B comprises a first circuit section 1 for the access analysis, a second circuit section 2 for the short-term estimation of the access persistence and a third circuit section 3 for the long-term estimation of the access persistence.

By way of contrast, the mobile station M comprises a first circuit section 4 for the parameter decoding, said first circuit section 4 being supplied with the persistence rule P and the load characteristic variables p(l) from the circuit sections 3 and 2 respectively of the base station B. The first circuit section 4 of the mobile station M is connected to a second circuit section 5 for the persistence adaptation which in turn is connected at its output end to a third circuit section 6 for the access control of the mobile station M. With regard to an access, the mobile station M communicates via the third circuit section 6 with the first circuit section 1 of the base station B, at which time the mobile station M also transmits information relating to the priority i which it has been assigned.

In principle, the method according to the invention can be described by the following four phases:

1 Indication of the Priority

Upon access to a radio channel, the mobile station M indicates the priority (i) of the transmission. This priority is binary-coded in the data word transmitted upon the access. For the detection of collisions and transmission errors, a check sum must additionally be used and transmitted.

2. Estimation of the Offered Traffic in the Network

The receiving unit in the mobile radio network or base station B estimates the offered traffic by measurements of the number of successful accesses NS(i) and, if technically possible, by the number of collisions NK. Here the traffic is differentiated in accordance with its different priorities.

For the estimation of the offered traffic, on the network side the successful accesses NS(i) of the different priorities (i) are counted over a time interval T. From the measured numbers of accesses, the number N(i) of logged-on stations of each priority (i) and the possibly known number NK of collisions, R is possible to estimate the number n(i) of active mobile stations of the respective priority (i). For this purpose it is necessary to take into account the load characteristic variables p(i) preset in the time interval T under consideration.

For example, the number n(i) of active mobile stations M can be iteratively estimated between two consecutive time Intervals T as follows:

$$n(i,t) = \max[n_{min}, n(i,t-T) - NS(i) + \lambda(i,t) \times T]$$

where $\lambda(i,T)$ is the estimated average arrival rate of requests of the priority i.

For $\lambda(i,T)$, by observing the N time slots of the time interval T, the following upper estimation can be selected:

$$\lambda(i, t) < \frac{NS(i) + NK \times \left[1 - (1 - p(i, t - T))^{n(i, t - T)}\right]}{N}$$

The value of p(i,t-T) here represents the access probability of a mobile station in the preceding time period and is set in accordance with the preselected persistence rule P.

3. Transmission of the Persistence Rule P and of the Load Characteristic Variables p(i)

Following the estimation of the offered traffic, for each priority a load characteristic variable p(i) is periodically transmitted at short time intervals T1 from the network or base station B to the mobile station M. Additionally, from the long-term estimation of the offered traffic a persistence rule P is defined, which rule is transmitted at longer intervals T2>T1 to the mobile station M.

Thus from the offered traffic, for each priority i the network or base station B defines a characteristic variable of the load p(i) from the estimated number of active mobile stations n(i), which characteristic variable is transmitted periodically to the mobile stations M for each priority i. The persistence rule P is transmitted at periodic intervals from the network to the mobile radio subscriber and is stored in the mobile stations M. The period duration is preset by the network.

Upon implementation, the persistence rule P can take the form of a set of coefficients of a suitable function or a set of tables.

For example, the characteristic variable of the load p(i) is formed from the number n(i) of the estimated number of currently active subscribers and the number N(i) of subscribers having logged on with the same priority:

$$p(i) = 10 \times n(i)/N(l)$$

4. Adaptation of the Persistence of the Mobile Station M

On the basis of the received load characteristic variables p(i) and the received persistence rule P, and as a function of the priority of the communication to be transmitted, the mobile station M now gains access to the channel upon its next attempt.

The load characteristic variables p(i) then represent the index values for the persistence tables P stored in the mobile stations M. Such persistence tables P (persistence rules) can be calculated in a suitable manner or determined empirically. Here, in accordance with a development of the invention, the persistence of a mobile station M is dependent only upon the load characteristic variable p(i) of the priority i in question and the sum of the characteristic variables of the load of lower priorities.

If the persistence is represented by an access probability, upon a transmission request the mobile station gains access to the channel only with a specified access probability 0<q<1.

In the mobile station the following steps are now performed:

a) On the basis of a calculation rule, the mobile station generates quasi-random, equally distributed numbers in a closed interval [0,Z-1], where Z is an integer.

b) If the selected number is smaller than q×Z, the mobile station will gain access to the channel in the time interval in question. If this number is greater, the access is suppressed and the mobile station stores the request. This request is then reconsidered at a predetermined, later time.

c) If a collision occurs when an access is taking place, the mobile station stores the request. This request is then reconsidered at a predetermined, later time.

d) If the number of attempts exceeds a predetermined number, the request can also be completely discarded and an error message transmitted.

Here the abandonment by the mobile station of an access to the channel reduces the probability of collisions. This in turn increases the throughput on the channel, which is also advantageous for the mobile station.

The persistence rule P can be developed in accordance with different principles:

a) It can be optimised so as to maximise the throughput achieved on the channel.

b) It can be optimised so as to minimise the average access delay of a request to be transmitted.

c) It can be optimised in such manner that a specified, maximum access delay is exceeded only with a specified probability.

The following must additionally be taken into account:

a) When different priorities are used, requests of a higher priority (here with a lower priority number) must be handled with precedence.

b) In the selection of the table values of a persistence table or the parameters of a persistence function, only suitable values are to be allowed (quantisation) in order to minimise the capacity required for the transmission of the values.

In the following an example of a persistence rule P, realised by persistence tales, will be described when three priorities are to be differentiated and the load characteristic variables p(i) can assume four values. Here the access probability is to be considered as an instance of the persistence, for example.

Here the values of the tables have been selected heuristically in such manner that the system has the same properties for an individually occurring priority class and the individual values of the table obey a simple formation law and thus can be transmitted in a simple manner.

The load characteristic variable of the priority in question determines the selection of the table column while the sum of the load characteristic variables of the higher priorities determines the selection of the table row. If the value exceeds the given range of values, the highest possible value of the load characteristic variable is selected.

The tables contain the relevant value of the access probability.

Access Probability of a Mobile Station with Priority 1–P(1)

| p(1) = 0 | p(1) = 1 | p(1) = 2 | p(1) = 3 |
|---|---|---|---|
| 1 | ½ | ¼ | ⅛ |

Access Probability of a Mobile Station with Priority 2–P(2)

| | p(2) = 0 | p(2) = 1 | p(2) = 2 | p(2) = 3 |
|---|---|---|---|---|
| p(1) = 0 | 1 | ½ | ¼ | ⅛ |
| p(1) = 1 | ½ | ¼ | ⅛ | 1/16 |
| p(1) = 2 | ¼ | ⅛ | 1/16 | 1/32 |
| p(1) = 3 | ⅛ | 1/16 | 1/32 | 1/64 |

Access Probability of a Mobile Station with Priority 3–P(3)

|  | p(3) = 0 | p(3) = 1 | p(3) = 2 | p(3) = 3 |
| --- | --- | --- | --- | --- |
| p(1) + p(2) = 0 | 1 | ½ | ¼ | ⅛ |
| p(1) + p(2) = 1 | ½ | ¼ | ⅛ | 1/16 |
| p(1) + p(2) = 2 | ¼ | ⅛ | 1/16 | 1/32 |
| p(1) + p(2) = 3 | ⅛ | 1/16 | 1/32 | 1/64 |
| p(1) + p(2) = 4 | 1/16 | 1/32 | 1/64 | 1/128 |
| p(1) + p(2) = 5 | 1/32 | 1/64 | 1/128 | 1/256 |
| p(1) + p(2) = 6 | 1/64 | 1/128 | 1/256 | 1/512 |

The present invention includes any novel feature or combination of features disclosed herein either explicitly or any generalization thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A method of setting the persistence of a mobile station in a cellular mobile radio network for scheduling access requests of a predetermined priority within said network, said mobile station communicating with a network base station and having a series of processors for receiving load characteristic data, adapting persistence and controlling access, comprising the steps of:
   estimating in the base station a load characteristic variable within said network over a first predetermined time interval;
   transmitting to the mobile station said estimated load characteristic variable;
   setting in the base station a persistence rule, calculated over a second predetermined time interval, wherein said second predetermined time interval is longer than said first predetermined time interval;
   transmitting to the mobile station said persistence rule;
   processing in said series of processors in said mobile station said transmitted load characteristic variable and said transmitted persistence rule: and
   controlling the transmission of access requests from said mobile station to said base station in accordance therewith.

2. A method of setting the persistence of a mobile station in a cellular mobile radio network for scheduling access requests of a predetermined priority within said network, said mobile station communicating with a network base station and having a series of processors for receiving load characteristic data, adapting persistence and controlling access, said method as described in claim 1, wherein said step of estimating said load characteristic variable further comprises the steps of:
   detecting in the base station the number of successful accesses over a first predetermined time interval; and
   estimating in the base station, based on the detected accesses, the number of active mobile stations within said network.

3. A method of setting the persistence of a mobile station in a cellular mobile radio network for scheduling access requests of a predetermined priority within said network, said mobile station communicating with a network base station and having a series of processors for receiving load characteristic data, adapting persistence and controlling access, said method as described in claim 1, wherein said persistence rule is based on access probability and wherein said access probability is calculated from detected accesses and an estimated number of current subscribers.

4. A method of setting the persistence of a mobile station in a cellular mobile radio network for scheduling access requests of a predetermined priority within said network, said mobile station communicating with a network base station and having a series of processors for receiving load characteristic data, adapting persistence and controlling access, as described in claim 3, wherein access is gained based on access probability.

5. A method of setting the persistence of a mobile station in a cellular mobile radio network for scheduling access requests of a predetermined priority within said network, said mobile station communicating with a network base station and having a series of processors for receiving load characteristic data, adapting persistence and controlling access, as described in claim 1, wherein, if a collision of transmissions occurs, said access request is rescheduled after the expiration of a predetermined interval.

6. A method of setting the persistence of a mobile station in a cellular mobile radio network for scheduling access requests of a predetermined priority within said network, said mobile station communicating with a network base station and having a series of processors for receiving load characteristic data, adapting persistence and controlling access, as described in claim 1, wherein the load characteristic variable and the persistence rule is updated and transmitted at periodic intervals.

* * * * *